3,427,220
NUCLEAR REACTORS
Compton Alexander Rennie, Wareham, Dorset, George Edward Lockett, Parkstone, Poole, Dorset, and Pietro Acciarri, Wareham, Dorset, England, assignors to United Kingdom Atomic Energy Authority, London, England
Filed Nov. 22, 1965, Ser. No. 508,911
Claims priority, application Great Britain, Nov. 24, 1964, 47,765/64
U.S. Cl. 176—31                                   22 Claims
Int. Cl. G21c 19/22

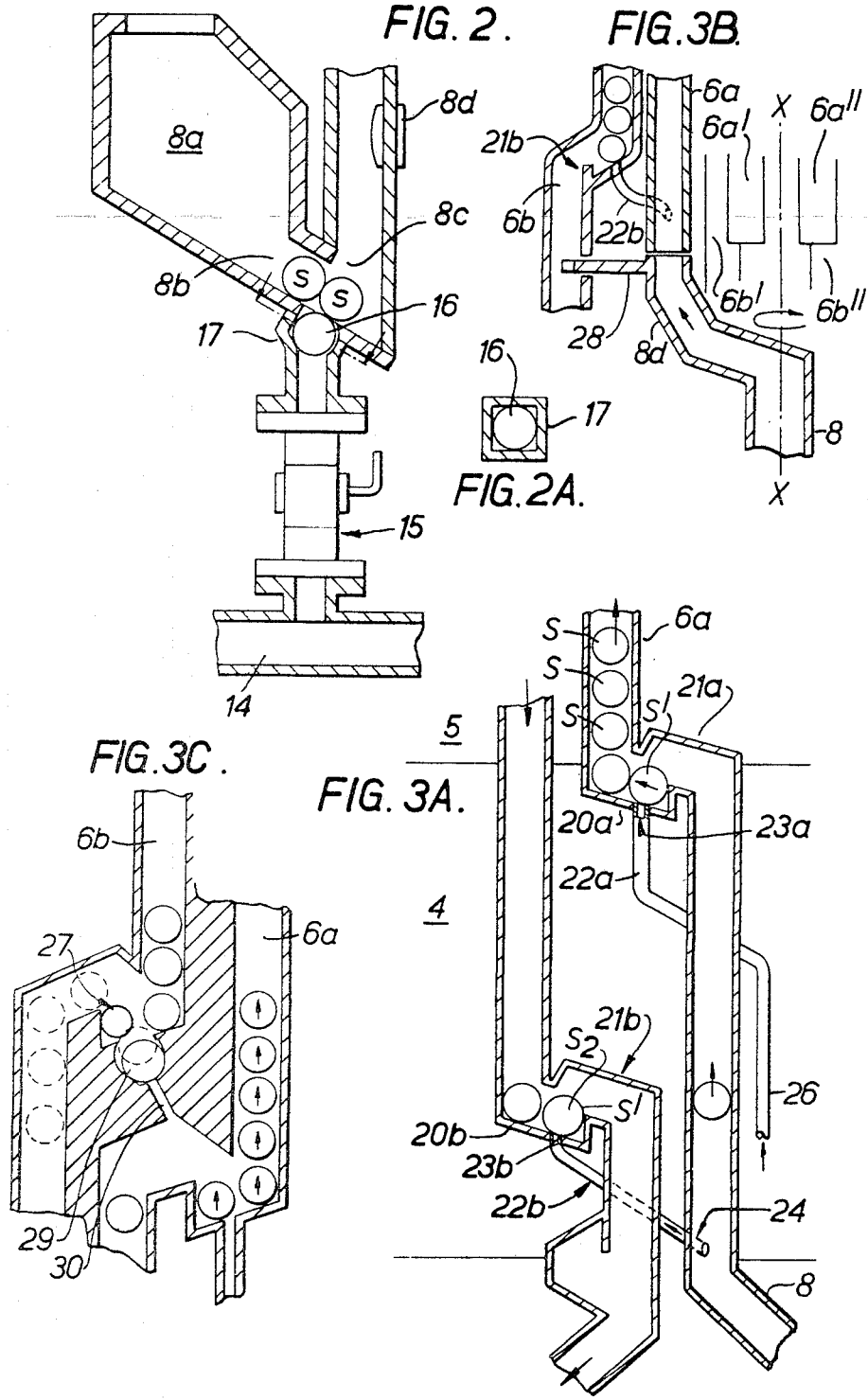

ABSTRACT OF THE DISCLOSURE

A nuclear reactor core is composed of driven fuel having a conversion ratio near to unity and being a net consumer of neutrons, in which is provided channels containing a readily replacable driver fuel which produces excess neutrons to maintain criticality during operation of the reactor. As the driver fuel pieces are replaced, the bulk of the core remains stationary for long periods, yet this latter portion also contributes to the power output of the core.

---

This invention relates to nuclear reactors employing both fissile and fertile material in the core. As is known a reactor core may employ both fissile and fertile material in proportions such that sufficient neutrons in excess of those required to maintain criticality are available for the conversion of fertile material into new fissile material. That proportion of the core which produces excess neutrons may therefore be considered to drive the fertile fuel neutronically and is referred to herein as the driver fuel. The remainder of the fuelled volume of the core, whilst producing neutrons at least as a result of the fission of the new fissile material, is a net consumer of neutrons and is referred to as the driven fuel.

The present invention aims to provide a reactor which allows fertile and fissile fuel to be employed in the core in an improved manner.

According to the invention in one aspect, a nuclear reactor has a core which includes at least two solid fuel compositions serving respectively driver and driven functions in the core, the driven fuel having a conversion ratio near to unity, the driver fuel being segregated from the driven fuel and arranged in a manner which allows of its being fed on load with fresh driver fuel to sustain criticality. The driver fuel may be fed continuously or at spaced intervals of time to maintain an appropriate conversion ratio.

It is a feature of this reactor system that the core is susceptible of being operated over a considerable period without the need for displacement or replacement of a substantial proportion of the fuelled volume of core which may remain in its place in the core for a considerable period.

According to the invention in this aspect, a nuclear reactor core has its fuelled volume divided between a driven portion, normally the larger, which is capable of being driven by neutrons to sustain a conversion ratio near to unity and a driver portion providing those neutrons; the driver portion being arranged as several separate zones spaced apart in said driven portion, means for supplying, on load, fissile material to the driver zones as burnup proceeds and means for extracting heat from both the driver and driven portions of the core. The driver portion of the core may thus to some extent be diffused within the driven portion although the actual fuels are segregated from one another and the core can be considered to be substantially homogeneous at least from the point of view of neutron behaviour, with driver fuel within a number of zones scattered in the driven portion, to provide neutrons for conversion of the fertile material. Driver fuel may be fed continuously or intermittently and provides an excess of neutrons of appropriate energies for conversion of the fertile material into fissile species. In the system proposed, the supply of fresh fissile driver fuel to the core and withdrawal of burnt up fuel may be adjusted so that fuel cycle costs may be advantageously influenced.

The rate of feed, or the dwell time, of the driver fuel in each of the several zones may be uniform, or may differ according to the position of the zones in the core. Thus, the addition of fuel into the driver zones represents an addition of reactivity to the core and the rate of feed, if made continuous or nearly so, can be used to control reactivity and to replace or supplement other, more conventional, control devices such as burnable poisons or control absorbers. Moreover, the rate of feed can be adjusted across the core cross section in a manner which usefully affects core and coolant temperature distribution. For example, considering a solid cylindrical core the zones representing the driver portion of the fuelled volume may be disposed in a series, i.e. two or more of zones which are disposed in concentric and coaxial annular rows. The rate of feed of fresh fuel, being the same for each zone in the same row, may be progressively slower the further the row is located from the centre of the core so as to reduce the tendency for an uneven temperature distribution at the coolant outlet.

Considered therefore as a method of operating a nuclear reactor having segregated driver and driven fuel, the invention may be said to reside in the steps of supplying driver fuel to, and replacing it continuously or intermittently at, a number of predetermined positions extending in a nuclear core structure which is composed mainly of the driven fuel whose composition is fuelled to give a conversion ratio near to unity for conversion of the fertile material into fissile species.

The fuel in the driven portion may be uranium 238 or thorium 232 and may contain some fissile material also. The fertile fuel content is however driven by neutrons supplied mainly from the driver portion of the core to which fissile fuel, for example U 235, U 233 or plutonium is supplied.

The driver fuel may be in any suitable solid form such as solid rods, pieces, e.g., spheres, but may be in a form in which a supply can occupy a storage volume within or adjacent the reactor vessel of modest proportions from which position it can be fed to the driver fuel zones. For example, the driver fuel may be in spherical form and pass through the core under gravity or may be propelled in some manner. In the latter case, a feed mechanism is required and conveniently one such feed mechanism may be located at each of the zones which together make up the driver portion of the core.

Fuel leaving the driver zones may be passed, conveniently under gravity, to an irradiated fuel storage facility within the reactor vessel when it may be unloaded at a convenient time. By adopting this procedure refuelling the core on load becomes a part of normal operation and need not be linked with operations such as the opening up of the vessel enclosing the core. Reactor shutdown may thus be made substantially independent of the fuelling cycle, the fertile material in the driven portion remaining in place for many times the lifetime of the fissile material in the driver portions which is continually replaced.

If desired both the fresh fuel storage and irradiated fuel storage facilities within the reactor vessel may be respectively recharged and discharged through a suitable pressure lock controlling access ports in the vessel wall without communicating the interior of the vessel with the ambient atmosphere.

Channels for the driver fuel are arranged to penetrate the core and preferably define fixed, predetermined paths for the passage of fuel. In this way, provided suitable adjustments are made during the initial loading of fuel, the heat flux pattern throughout each passageway may remain sensibly constant during the passage of fuel.

Only the driver fuel, which in some applications could occupy 10% of the fuelled volume of the core, requires manipulation whilst the remaining portion of the core including the driven fuel may remain in situ for very long periods, possibly for a full reactor core life. The reactor fuel charge machinery may thus be greatly simplified being comprised of a number of mechanisms specially adapted to move small masses of fuel material.

Neutron moderating material may be used, and if a suitable solid material such as graphite is used for this purpose, it may form also the structural parts of the core giving support to the fertile material and/or fissile material and defining channels for coolant flow paths, control and shutdown absorber rods as required.

With graphite or other solid material as moderator, the coolant may be gaseous, preferably an inert gas, such as helium, but other moderators and coolants are envisaged including light water, heavy water and organic liquids. The use of liquid/coolant moderators will of course involve the use of suitable structure to define driver and driven portions in the cores according to the type of fuel used.

In one particular embodiment of the invention as applied to a gas cooled reactor, discussed here by way of example, the core is constructed mainly of graphite as the structural material in the form of columns arranged side by side, axes parallel.

Each of the columns is penetrated by a number of similar holes parallel with the column's longitudinal axis to provide passageways which pass coolant and house fuel.

One column in four has its passageways used for the feeding of driver fuel, e.g., uranium 235, in the carbide form and shaped as a rod which is slideable endwise in the hole with clearance passages for coolant gas.

The remaining three columns in each four have in their passageways fixed driven fuel, e.g., carbonaceous artifacts containing thorium and also a small proportion of uranium 235, again with clearance passages for coolant gas to flow in heat exchange relation with the driven fuel.

Thus in this arrangement the driven portion of the core occupies 75% of the total core volume while the driver portion of the core occupies the remaining 25% of the fuelled core volume.

The fuel itself occupies a fraction of the total volume of each column, the size of the fraction being chosen to comply with the fuel composition required for that column and the fuel surface geometry is chosen to provide a suitable heat transfer surface. Neutrons are emitted from the driver fuel and, after one or more collisions, some of these neutrons effect further fissions in the fuel content of the driver portion, whilst sufficient of the remainder enter the driven portion to effect the following reaction (in the case of the thorium cycle):

$$Th\ 232 + n \rightarrow Th\ 233 + \alpha$$

$$Th\ 233 \rightarrow Pa\ 233 \rightarrow U\ 233$$

The heat generated in both the driver and driven portions as a result of these reactions is removed by coolant gas flowing through the clearance mentioned above.

The composition of the fertile fuel is arranged such that it exhibits a conversion ratio C near to unity.

Ideally, $$C = \eta - 1 - L = 1$$

where $\eta$=Number of fission neutrons produced in fissionable material in the driven portion per neutron absorbed, L=Number of fission neutrons lost from the driven portion less the inleakage from the driver portion.

In a system which uses the thorium-uranium 233 cycle, the $\eta$ value (average number of neutrons liberated in the driver region per neutron absorbed in the fuel in the driven region), and hence the conversion ratio would be expected to remain fairly constant over a wide range of neutron energies.

At start up, however, the $\eta$ value is a function of the initial fuel composition and hence a composition is chosen which gives the ratio of the densities of thorium atoms to uranium atoms most likely to exhibit as high a conversion ratio as possible, i.e., close to unity.

In a modified version of the foregoing, a column of moderating material may have a central hole extending coincident with the column axis and providing a channel for driver fuel and a number of other holes parallel to the central hole and grouped symmetrically around it for driven fuel; coolant channels or clearances being provided to allow for heat removal from fuel in each of the holes. The invention extends to cover a reactor having a core composed of one or a number of such columns each of which is preferably of hexagonal shape in cross sections normal to its longitudinal axis.

It may also be envisaged that channels containing the driver fuel may be adapted to allow the fissile driver fuel to make two passes through the core, in which case it may be preferred that the second pass of fuel is made at a different rate than the first pass. This may be done by utilising spherical fuel bodies and forming the driver fuel passageways with their axes vertical and parallel to one another. Fuel spheres fed upwards through the central passageway may then engage guiding surfaces to cause successive spheres to be diverted downwards into parallel passageways for a second pass. By choosing a different ratio of the numbers of upward/downward passageways, the rate of upward and downward flow or transient may be chosen to suit a preferred fuel burn-up and/or heating pattern. Spherical fuel bodies may of course be employed in the single pass arrangements mentioned above.

The following table gives some typical data for a nuclear reactor embodying some features of the example discussed above.

*General data*

| | |
|---|---|
| Reactor thermal power | 1,250 mw. |
| Average core power density | 8 mw./m.³ |
| Helium temperature at core inlet | 300° C. |
| Mixed helium temperature at core outlet | 750° C. |
| Helium operating pressure | 40 ats. |
| Helium mass flow | 535.000 g./s. |
| Power generated in driver portion | Approx. 30% of total. |
| Power generated in driven portion | Approx. 70% of total. |
| Average driver fuel invested composition | 182 kg. U 235. |
| Initial driven fuel invested composition | 423 kg. U 235, 16900 kg. Th 232. |
| Approx. rate of feed of fissile fuel through driver zones (averaged) | 0.5 kg. per day. |

An example of a charge/discharge arrangement for driver fuel will now be described with reference to the accompanying diagrammatic drawings in which.

Figure 1:
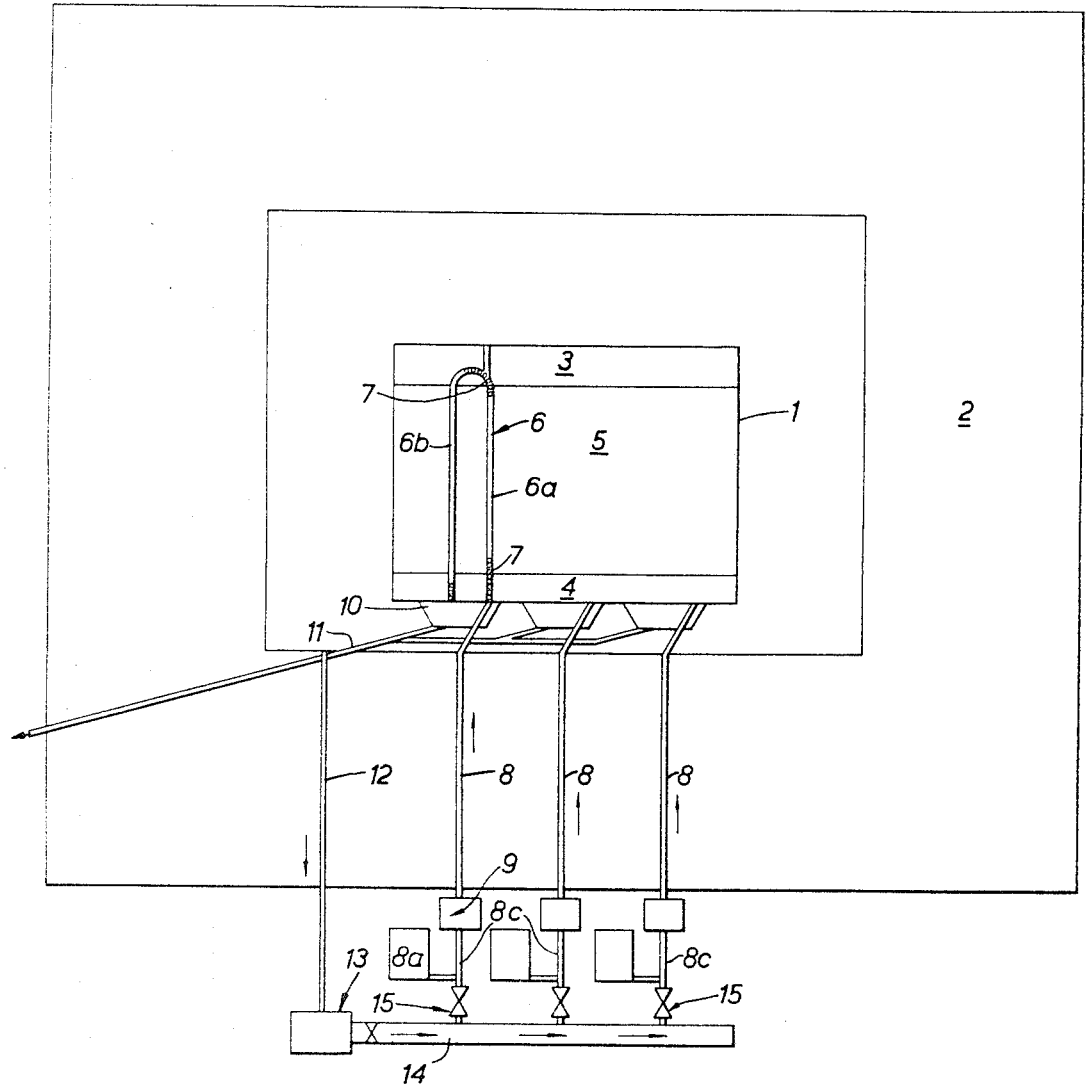
FIGURE 1 shows diagrammatically a gas cooled nuclear reactor with its driver fuelling arrangements which are intended to feed fuel in discrete pieces by levitation; whilst FIGURES 2 and 3 A, B, C are diagrams useful for explaining the feed mechanism.
Figure 4:
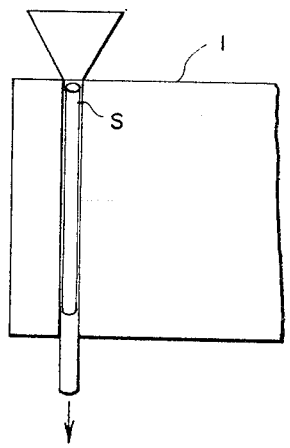
FIGURE 4 shows, diagrammatically, a portion of a nuclear fuel reactor core showing driven fuel in the form of solid rods.
Figure 5:
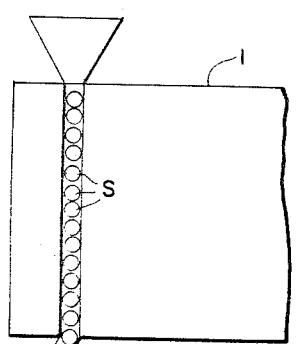
FIGURE 5 shows, diagrammatically, a portion of a nuclear reactor core showing an arrangement for charging pieces into the channel at one face and discharging them at the opposite face of the reactor.
Figure 6:
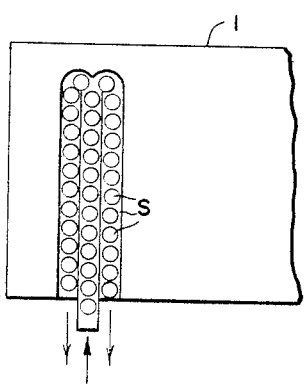
FIGURE 6 shows, diagrammatically, a portion of a nuclear reactor core showing an arrangement wherein some of the driver fuel channels extend from a charging face of the reactor core towards an opposite face wherein a region of the channel adjacent the opposite face communicates with a plurality of further channels extending towards the charging face.
Figure 7:
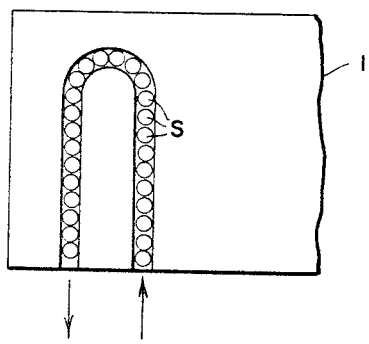
FIGURE 7 shows, diagrammatically, a portion of a nuclear reactor core wherein driver fuel is fed into one end of a re-entry channel extending within the driven fuel and withdrawn from the other end of same channel.

In FIGURE 1 of the accompanying drawings the core 1 of a gas cooled nuclear reactor is shown supported within a pressure vessel. The coolant circuit and its accessories are omitted for the sake of clarity but it is to be understood that heat extraction from the core follows the conventional practice of passing a coolant fluid through passages in the core in heat exchange with the fuel and thence to heat utilisation plant. The core 1 has top and bottom neutron reflectors 3, 4 respectively and an active portion 5 composed mainly of moderator material and containing solid nuclear fuel whose composition is that of driven fuel, but with channels 6 for solid driver fuel which channels are of such a size and so positioned in the driven fuel that they may be charged with sufficient driver fuel to maintain criticality when the conversion ratio of the driven fuel is near to unity.

A number of channels 6 of inverted U-shaped (only one of which is shown) extend within the core portion 5 and have limbs designated 6a, 6b, the open ends of which are accessible at the lower, or charge, face of the core. The portion 5 of the core is driven neutronically by neutrons supplied from driver fuel fed through the channels 6. The driver fuel, being discrete solid pieces, e.g., spheres 7, is introduced into limbs 6a, caused to move through that limb and withdrawn through limb 6b. Both charge and discharge of fuel is thus effected from the face of the bottom reflector.

For this purpose the lower end of the limb 6a communicates with a fuel supply conduit 8 which is connected to a feed mechanism 9 outside the pressure vessel 2. The lower end of the limb 6b communicates via a hopper 10 with a pipe 11 leading to a spent fuel disposal facility.

For the insertion of new fuel, those fuel bodies already within the channel limb 6a are supported by levitation (using reactor coolant) whilst a fresh fuel body is introduced. Thus a pipe 12 is arranged to lead coolant from some part of the primary coolant circuit, typically the interior of the pressure vessel 1, through a compressor 13 delivering high pressure coolant to a ring main 14.

As shown in FIGURES 1–2, valved tappings 15 from the ring main 14 communicate pressurised coolant with conduits 8 whilst, at a position between the main and the conduits, fuel is introduced. The feed mechanism 9 for this purpose in FIGURES 1 and 2 comprises a hopper 8a for holding a supply of spherical fuel bodies which can roll singly through port 8b to enter feed pipe 8c. The latter includes a microswitch 8d for counting the number of spheres which pass through the feed pipe 8c.

Between the valved tapping 15 and the feed pipe 8c is a ball valve 16, the ball of which is loosely retained in a pipe 17 of a square bore (FIGURE 2A) so as to allow coolant to pass upwardly through the feed pipe 8c but preventing the fuel spheres S from falling into the valved tapping 15 when coolant pressure is dropped below the levitation level. To introduce a fuel sphere into the core, the valve in the tapping 15 is opened so as to transfer pneumatically a fuel sphere, which passes by gravity from the bottom of the hopper 8a, through the conduit 8c into limb 6a while the column of spheres in the limb 6a are supported by levitation and advanced to leave free space for the fuel sphere to enter the limb 6a. Meanwhile one fuel sphere at the top of channel 6 passes from limb 6a to limb 6b, and at the bottom of the latter limb a sphere passes from channel 6 to disposal.

As shown in FIGURE 3A, the lowermost spheres $S^1$ in each channel at positions where the limb 6a enters the top face, and the limb 6b, the bottom face, of the bottom reflector, rest on sloping surfaces 20a, 20b respectively leading to U-bends 21a, 21b. The U-bends prevent fuel moving into the further downward extension of the channels except when a jet of pressure gas is blown along conduit 8 and lifts the lowermost ball $S^1$ along the sloping surface 20a pushing in front of it the balls S—S. Simultaneously the pressure gas is admitted via pipe 22b to nozzle 23b so lifting sphere $S^2$, causing the sphere $S^2$ to pass round the U-bend into the downwardly extending conduit to enter the hopper 10.

For use in emergency a supplementary channel 26 is provided to convey high pressure gas directly to a nozzle 23 in the U-bend 21a. In this way it is possible to discharge these spheres in limb 6a downwardly through conduit 8.

In a modification of the above arrangement the walls of the channel 6 may be fluted longitudinally or spirally to allow greater coolant flow rates before levitation.

It is easy to visualise how, by making the upper end of the conduit 8 rotatable, a single conduit 8 may communicate one hopper with a number of limbs 6a arranged parallel to one another with their open lower ends on a common radius about the vertical axis of the conduit 8. The latter is then made rotatable about that vertical axis so that the upper end portion of the conduit 8 passes in turn over open ends of the channels.

Such an arrangement is shown in FIGURE 3B wherein the terminal portion 8d of the conduit 8 is rotatable about axis X—X so that it can serve parallel limbs 6a, $6a^1$, $6a^{11}$ disposed on a circle concentric with a row of associated limbs 6b, $6b^1$, $6b^{11}$. Projecting laterally from the conduit 8 is an arm 28 which enters a slot in each limb 6b at a given position below the U-bend 21b as the conduit 8 comes into register with the adjacent limb 6a. Thus with the conduit 8 registering with limb 6a in FIGURE 3C the arm enters slot in the limb 6b and, subsequently, on admitting pressure gas to conduit 8 only a given number of spheres can be lifted over the U-bend 21b. These are held in the vertical part of limb 6b by the arm 28 until the conduit 8 rotates to a new position allowing the spheres to fall into the discharge hopper.

To ensure discharge one at a time a ball valve may be incorporated in the discharge U-bend as shown in FIGURE 3C wherein the lowermost fuel sphere in discharge channel 6b is held, in normal operation, in the U-groove by a shoulder 27. Beneath this sphere is a recessed ball 29 capable of being lifted by an air supply through opening 30 leading to the limb 6a such that each time levitation gas is applied to the limb 6a the ball valve is lifted to eject a single fuel sphere over the U-bend shoulder 27.

As an alternative to a rotary feed conduit 8, there may be arranged a number of feed conduits arranged on a pitch circle and each communicating a common hopper with a corresponding number of channel limbs 6a. Such a hopper would comprise a rotary platform domed on its upper surface so that fuel spheres tend to roll under gravity into slots in the periphery of the platform. The slots can be brought into register with feed pipes by appropriate orientation of the platform and thus a plurality of feed pipes may be fed simultaneously.

During normal operation however between feeding operations the fuel spheres in the limbs 6a, 6b rest in super position and are held by U-bends such as are shown in FIGURE 3A.

Although in the drawing each channel in the reactor core is shown containing a column of superimposed fuel spheres, each channel may contain a plurality of columns of spheres. To improve the cooling of the spheres in a multicolumn channel, the channel may be shaped polygonally in its cross section normal to longitudinal axis of the channel. Additionally, a fixed central, longitudinal spacer may be supported centrally along the channel axis so that further voidage and contact surface may be provided for the passage of coolant whose flow rate can be enlarged due to this additional restraint against levitation. One arrangement is envisaged with a channel which is triangular in its transverse cross section and contains three adjacent ascending columns of fuel spheres. The channel contains a central axial rod of triangular transverse cross section which by providing additional fixed contact surfaces for the fuel spheres allows higher coolant flow rates before levitation of the spheres occurs.

Where other shapes of driver fuel bodies are employed suitable fuel advancing mechanisms may be used which permit on load refuelling.

FIGURES 4-7 show modified arrangements for carrying out the features of the present invention wherein the letter "S" indicates the driver fuel and the arrows indicate the direction of driver fuel through the core.

Although in the above described example, reactor cores incorporating moderator material have been envisaged the same principle may be applied to other reactor types having unmoderated cores where similar advantages may be gained.

Reactors operated as aforesaid may achieve certain of the advantages particularised below and these to an extent according to the degree of continuousness or residence time of the driver fuel and driven fuel in the reactor core.

For example a lower fuel inventory is involved in reactor operation with a large proportion of the fuel, i.e., driven fuel kept in the reactor for the near-life of the core and driver fuel replaced continually and it is no longer necessary to prepare second charge fuel in large quantities. Similar advantages accrue on the reprocessing side where storage of large amounts of radioactive irradiated material is avoided and a smoother flow of modest quantities of spent fuel is delivered to the plant.

Advantages which stem from the differences in residence times of the driver and driven fuels in the core derive from the flexibility which this gives to the fuel management operations. For instance it is now possible to optimise on the relative fuel burnup and poison build up of the respective fuels with a view to maximum burnup or to minimise fuel cost whichever consideration is considered paramount. Moreover the operator is given freedom to alter the load factor of the reactor over shorter periods than was possible hitherto bearing in mind that only relatively small quantities of fuel are concerned in the making of such changes. Finally the arrangement facilitates the application of on-load refuelling to high temperature gas cooled reactors, e.g., having outlet gas temperatures of 600° C.-800° C. again due to the small fuel masses dispersed across the core cross section.

It is to be noted that the invention extends to cover a method of operating a nuclear reactor substantially in the manner described herein.

We claim:

1. A nuclear reactor having a core which includes at least two solid nuclear fuel portions, a driver portion and a driven portion serving respectively driver and driven functions in the core, the driver portion being arranged at several separate zones spaced apart within the core and containing fuel which produces neutrons in excess of the amount required to sustain critically, and the driven portion comprising discrete bodies of fuel located in driven fuel zones separate from the said driver fuel zones and substantially stationary in said core during on load conditions, the said driven portion of the core being a net consumer of neutrons and having a conversion ratio near to unity, means for feeding fissile fuel into the said zones of the driver portion under on load conditions to maintain criticality as burn-up proceeds, and means for withdrawing spent fuel from the said zones of the driver portion under on load conditions.

2. A nuclear reactor as claimed in claim 1 including means for extracting heat from both the driver and driven portions of the core.

3. A nuclear reactor as claimed in claim 1 including means for moving the fuel through said driver portion continuously.

4. A nuclear reactor having a core according to claim 1 wherein said driver zones comprise a number of parallel channels, driver fuel within said channels providing neutrons for driving the adjacent driven fuels and means for adding driver fuel to selected ones of said channels whilst the reactor is on load.

5. A nuclear reactor as claimed in claim 4 and including a means for replacing driver fuel in the core at a number of consecutive positions in order to optimise heat conditions in the core.

6. A nuclear reactor as claimed in claim 4 in which the driven fuel is dispersed in solid moderator having the said channels formed for driver fuel formed therein.

7. A nuclear reactor as claimed in claim 6 in which the driver fuel is in the form of a solid rod.

8. A nuclear reactor as claimed in claim 6 in which the driver fuel is in the form of a number of discrete pieces.

9. A nuclear reactor as claimed in claim 8 in which the driver fuel is in the form of spherical bodies.

10. A nuclear reactor as claimed in claim 9 in which the channels for driver fuel are disposed in groups, each of said groups being disposed on a pitch circle for receiving fuel from a charge machine rotatable about the centre of the circle.

11. A nuclear reactor as claimed in claim 8 including means for charging pieces into the channels at one face and discharging them at the opposite face of the reactor.

12. A nuclear reactor as claimed in claim 8, in which the driver fuel is fed through channels in the driven fuel in discrete steps.

13. A nuclear reactor as claimed in claim 12 in which the rate of feed is varied as between different positions in the core.

14. A nuclear reactor as claimed in claim 8 in which the channels for driver fuel are arranged to follow a path so that the driver fuel makes more than one pass through the core.

15. A nuclear reactor as claimed in claim 14 in which at least some of the feed channels for driver fuel extend from a charging face of the reactor core towards an opposite face thereof, a region of said channel adjacent said opposite face communicating with a plurality of further channels extending towards and terminating at said charging face.

16. A nuclear reactor as claimed in claim 15 including means for delivering discrete fuel bodies into said channels and for withdrawing fuel bodies from said further channels in which rate of delivery of fresh fuel bodies is varied across the core cross section.

17. A nuclear reactor as claimed in claim 9 including means for supplying spherical driver fuel bodies into one end of a re-entrant channel extending within the driven fuel and withdrawing similar bodies from the other end of said channel.

18. A nuclear reactor as claimed in claim 17 in which the spherical fuel bodies are retained within the channels by U-bend portions, gas nozzles being provided in said portions for assisting said bodies through said portions.

19. A nuclear reactor as claimed in claim 18 including a rotatable supply conduit for supplying pneumatically spherical fuel bodies to a plurality of said channels arranged on a pitch circle about which the supply conduit is rotatable.

20. A nuclear reactor as claimed in claim 19 in which said rotating conduit carries means for controlling the discharge of spherical bodies from the channels.

21. A nuclear reactor as claimed in claim 19 in which the discharge of fuel spheres is controlled by a ball valve in the discharge channels operated by gas supplied from the charging channel.

22. A nuclear reactor as claimed in claim 6 including a means for replacing driver fuel in the core at a number of consecutive positions in order to optimize flux conditions in the core.

References Cited

UNITED STATES PATENTS

| | | | |
|---|---|---|---|
| 2,982,711 | 5/1961 | Rand | 176—31 |
| 2,992,174 | 7/1961 | Edlund et al. | 176—30 |
| 3,089,835 | 5/1963 | Schulten et al. | 176—90 |
| 3,142,625 | 7/1964 | Wellborn | 176—32 |
| 3,271,263 | 9/1966 | Frame et al. | 176—30 |

FOREIGN PATENTS

| | | |
|---|---|---|
| 792,114 | 3/1958 | Great Britain. |
| 839,392 | 6/1960 | Great Britain. |
| 853,269 | 11/1960 | Great Britain. |
| 911,863 | 11/1962 | Great Britain. |
| 935,130 | 8/1963 | Great Britain. |

OTHER REFERENCES

Second U.N. Conference on Peaceful Uses of Atomic Energy, vol. 8, 1958, pp. 329–331, 338, 339, 342, 343, 345, 450, 453, 454, 458, 459, 460.

BENJAMIN R. PADGETT, *Primary Examiner.*

H. E. BEHREND, *Assistant Examiner.*

U.S. Cl. X.R.

176—18